United States Patent
Gentile et al.

(10) Patent No.: US 10,318,888 B2
(45) Date of Patent: Jun. 11, 2019

(54) PRE-BACKING VIRTUAL STORAGE USING HISTORICAL LEARNED DATA

(71) Applicant: INTERNATIONAL BUSINESS MACHINES CORPORATION, Armonk, NY (US)

(72) Inventors: Joseph W. Gentile, New Paltz, NY (US); Nicholas C. Matsakis, Poughkeepsie, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/450,297

(22) Filed: Mar. 6, 2017

(65) Prior Publication Data

US 2018/0253245 A1    Sep. 6, 2018

(51) Int. Cl.
| | |
|---|---|
| *G06F 13/00* | (2006.01) |
| *G06N 20/00* | (2019.01) |
| *H04L 29/06* | (2006.01) |

(52) U.S. Cl.
CPC ......... *G06N 20/00* (2019.01); *H04L 63/0272* (2013.01)

(58) Field of Classification Search
CPC ...... G06F 3/0631; G06F 3/0653; G06F 3/064; G06F 3/067; G06F 3/0604; G06F 11/1458; G06F 11/1451; G06F 11/1448; G06F 11/1461; G06N 99/005; H04L 63/0272
USPC ................. 711/162; 707/644, 654
See application file for complete search history.

(56) References Cited

U.S. PATENT DOCUMENTS

| | | | |
|---|---|---|---|
| 7,376,808 B2 | 5/2008 | Cascaval et al. | |
| 7,774,315 B1* | 8/2010 | Galker | G06F 11/1464 707/644 |
| 7,895,161 B2* | 2/2011 | Sugimoto | G06F 11/1458 707/640 |
| 8,924,352 B1* | 12/2014 | Andruss | G06F 11/1461 707/640 |
| 9,361,215 B2 | 6/2016 | Peters et al. | |

(Continued)

FOREIGN PATENT DOCUMENTS

WO        2015180648 A1    12/2015

OTHER PUBLICATIONS

Jantz et al., "A Framework for Application Guidance in Virtual Memory Systems", VEE' 13, Mar. 16-17, 2013, ACM SIGPLAN Notices, v. 48, n. 7, pp. 155-165.

*Primary Examiner* — Hong C Kim
(74) *Attorney, Agent, or Firm* — Cantor Colburn LLP; William Kinnaman (57) ABSTRACT

A computer system includes memory and a processor configured to manage memory allocation. Aspects include receiving a request to execute a computer program and obtaining a learned data file for the computer program, the learned data file including a history of memory allocation requests and memory access requests by the computer program. Aspects also include receiving a memory allocation request from the computer program and allocating one or more pages of a virtual memory to the computer program, wherein a size of the one or more pages is based on the learned data file. Aspects further include backing at least one of the one or more pages of the virtual memory in the real memory prior to receiving an access request for the at least one of the one or more pages based on the learned data file.

17 Claims, 5 Drawing Sheets

(56) References Cited

U.S. PATENT DOCUMENTS

| | | | | |
|---|---|---|---|---|
| 2008/0301201 A1* | 12/2008 | Sugimoto | ............ | G06F 11/1458 |
| 2010/0274983 A1* | 10/2010 | Murphy | .............. | G06F 11/1456 |
| | | | | 711/162 |
| 2011/0191777 A1* | 8/2011 | Bansal | ...................... | G06F 9/46 |
| | | | | 718/102 |
| 2012/0324196 A1 | 12/2012 | Maillet et al. | | |
| 2015/0256476 A1 | 9/2015 | Kurtzman et al. | | |

* cited by examiner

PRE-BACKING VIRTUAL STORAGE USING HISTORICAL LEARNED DATA

BACKGROUND

The present disclosure relates to managing the backing of virtual memory with real memory, and in particular to pre-backing virtual memory with real memory based on learned data regarding memory utilization.

Most if not all computer systems use virtual memory to simulate more real storage to the user than is possible to physically have. As such, an operating system's (OS) memory or storage manager working with system hardware must ensure that a virtual storage page be associated or backed by real system storage in order for it to be used by the computer hardware.

In general, a real storage manager (RSM) controls the use of real storage and directs the movement of virtual pages between auxiliary storage and real storage. The RSM makes all addressable virtual storage appear as real or physical storage to a user, while only the virtual pages necessary for execution are kept in real storage, these pages are often referred to as being backed. This backing is required when a virtual page is referenced or in some systems some of the virtual storage is backed when the storage is requested to be allocated by the user program or application.

The RSM assigns real storage frames on request from a virtual storage manager (VSM), which manages the allocation of virtual storage pages, and the RSM determines a size of memory that will be allocated to back a virtual storage page. Examples of memory backing sizes include 4 kB, 1 MB, and 2 GB. Software applications using larger segments of virtual storage, such as multiple Mbytes, can achieve measurable performance improvement if these segments are backed by larger page frames in real memory, such as the 2 GB page frame.

During memory allocation, some portion of the virtual storage allocation is backed in the real memory. For example, a request to allocate 8K of virtual memory can result in the first 4 k being backed immediately while the second 4 k is not. The assumption is that the program requesting the virtual storage will use the first page immediately so it is best for performance to just back it. Another way that a virtual page is backed in the real memory is when a page fault occurs. In this case, the hardware causes an interrupt because the dynamic address translation (DAT) for the virtual page resulted in no real frame backing the virtual page. This interrupt drives RSM to back the page immediately which also results in the DAT tables being updated so the hardware can find the backing page. In general, page fault faults are expensive in terms of time and computing resources.

In current systems, the RSM does not know what pages the application will need in advance, so it cannot optimize by backing additional pages ahead of when they are needed. As a result, when the program often experiences reference pages faults as it touches its storage during execution, the time required to back the storage also elongates the time between sections of the application's execution time as the OS is running. This, in turn, leads to clearing the application's data from L1/L2 cache before it executes again.

In addition, the use of large memory pages rather than small ones by the VSM increases performance as the processor does not need as many Table Look aside Buffer (TLB) entries for the same storage range because there is only one entry per page. As such, using larger pages are beneficial if the storage is used and can cause fragmentation if not used. For example, if the application requests 4 GB of virtual storage but only uses the 1st 8 k then two 4 k pages would be better than using 2 GB to back the 8 k.

SUMMARY

Exemplary embodiments include a computer system including memory and a processor. The processor is configured to receive a request to execute a computer program and obtain a learned data file for the computer program, the learned data file including a history of memory allocation requests and memory access requests by the computer program. The processor is also configured to receive a memory allocation request from the computer program and to allocate one or more pages of a virtual memory to the computer program, wherein a size of the one or more pages is based on the learned data file. The processor is further configured to back at least one of the one or more pages of the virtual memory in the real memory prior to receiving an access request for the at least one of the one or more pages based on the learned data file.

Additional exemplary embodiments include a computer program product that includes a computer readable storage medium having computer readable instructions stored thereon that, when executed by a processing unit implements a method. The method includes receiving a request to execute a computer program and obtaining a learned data file for the computer program, the learned data file including a history of memory allocation requests and memory access requests by the computer program. The method also includes receiving a memory allocation request from the computer program and allocating one or more pages of a virtual memory to the computer program, wherein a size of the one or more pages is based on the learned data file. The method further includes backing at least one of the one or more pages of the virtual memory in the real memory prior to receiving an access request for the at least one of the one or more pages based on the learned data file.

Further exemplary embodiments include a computer-implemented method that includes receiving a request to execute a computer program and obtaining a learned data file for the computer program, the learned data file including a history of memory allocation requests and memory access requests by the computer program. The method also includes receiving a memory allocation request from the computer program and allocating one or more pages of a virtual memory to the computer program, wherein a size of the one or more pages is based on the learned data file. The method further includes backing at least one of the one or more pages of the virtual memory in the real memory prior to receiving an access request for the at least one of the one or more pages based on the learned data file.

Additional features and advantages are realized by implementation of embodiments of the present disclosure. Other embodiments and aspects of the present disclosure are described in detail herein and are considered a part of the claimed invention. For a better understanding of the embodiments, including advantages and other features, refer to the description and to the drawings.

BRIEF DESCRIPTION OF THE DRAWINGS

The subject matter which is regarded embodiments of the present disclosure is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Exemplary embodiments include methods, systems and computer program products for pre-backing virtual memory with real memory based on learned data. In exemplary embodiments, pre-backing virtual memory with real memory reduces the number of page faults that occur when a program attempts to access virtual memory that has not been backed. The pre-backing is performed when a program is launched based on learned data for that program that is stored by the operating system. The learned data includes data regarding the historical virtual and real memory usage of the program which includes the page fault history for a program. In exemplary embodiments, the learned data is applied when a program is launched in order pre-allocate backing pages in the real memory and to determine the best page sizes to use. In exemplary embodiments, the learned data can be collected and/or updated during runtime of the program, during the development of the program, during performance testing of the program or the like.

Figure 1:
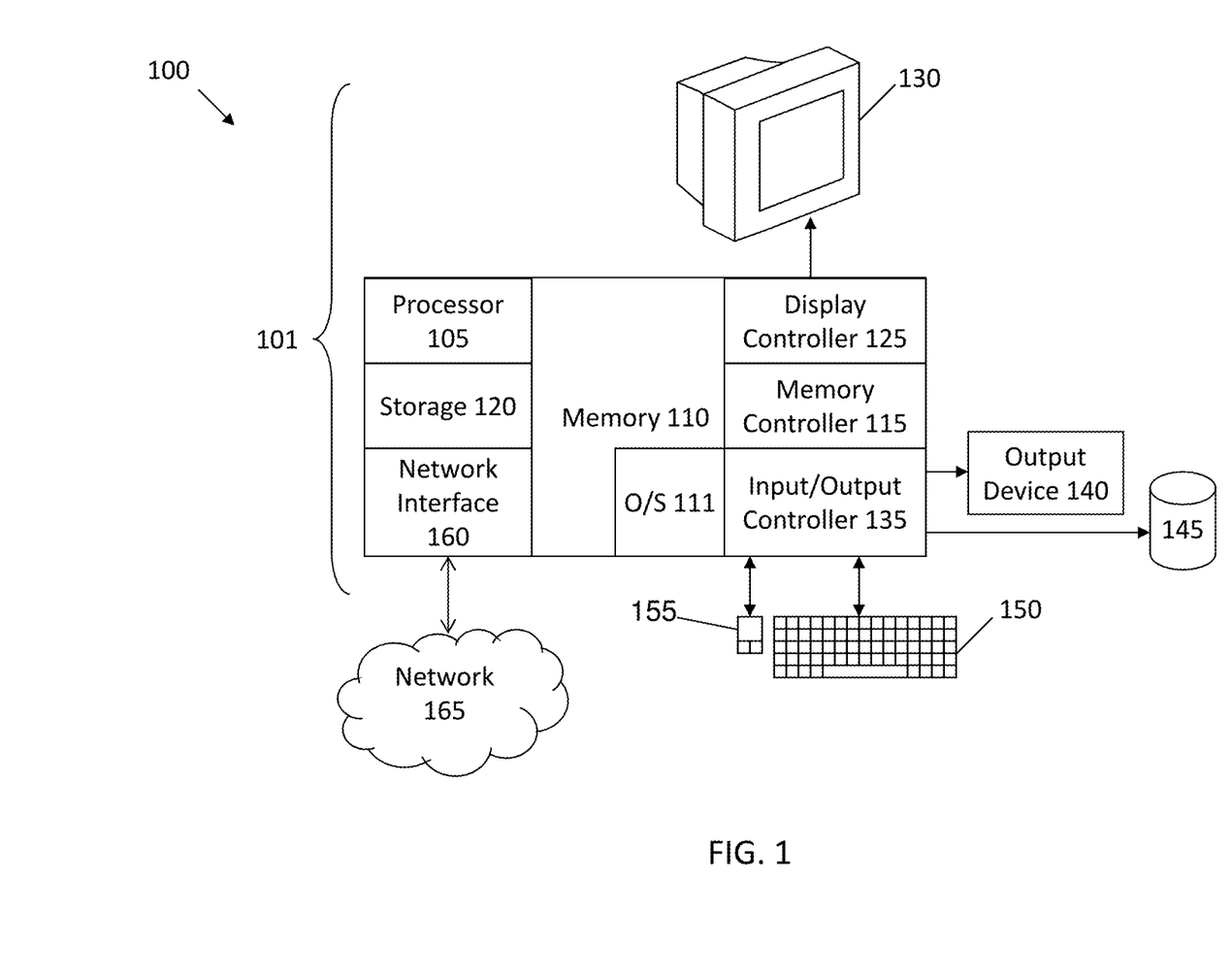
FIG. 1 illustrates a computer system according to an embodiment.

FIG. 1 illustrates a block diagram of a computer system 100 according to another embodiment of the present disclosure. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 100 therefore may include general-purpose computer or mainframe 101 capable testing a reliability of a base program by gradually increasing a workload of the base program over time.

In an exemplary embodiment, in terms of hardware architecture, as shown in FIG. 1, the computer 101 includes a one or more processors 105, memory 110 coupled to a memory controller 115, and one or more input and/or output (I/O) devices 140, 145 (or peripherals) that are communicatively coupled via a local input/output controller 135. The input/output controller 135 can be, for example, one or more buses or other wired or wireless connections, as is known in the art. The input/output controller 135 may have additional elements, which are omitted for simplicity in description, such as controllers, buffers (caches), drivers, repeaters, and receivers, to enable communications. Further, the local interface may include address, control, and/or data connections to enable appropriate communications among the aforementioned components. The input/output controller 135 may include a plurality of sub-channels configured to access the output devices 140 and 145. The sub-channels may include, for example, fiber-optic communications ports.

The processor 105 is a hardware device for executing software, particularly that stored in storage 120, such as cache storage, or memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (O/S) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

When the computer 101 is in operation, the processor 105 is configured to execute instructions stored within the memory 110, to communicate data to and from the memory 110, and to generally control operations of the computer 101 pursuant to the instructions.

Figure 2:
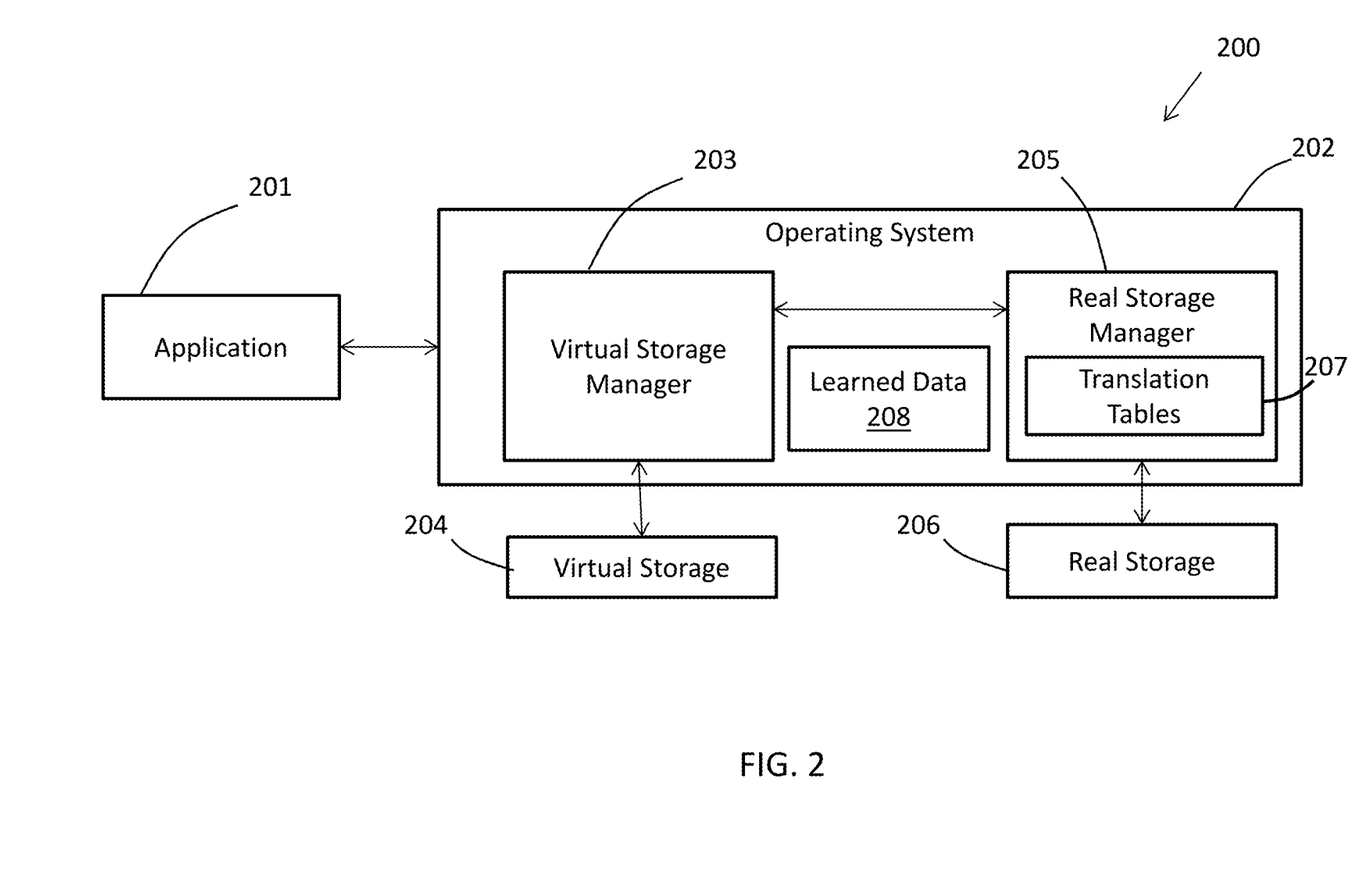
FIG. 2 illustrates a block diagram of a storage management system according to an embodiment.

FIG. 2 is a block diagram of a memory allocation system 200 according to an embodiment of the present disclosure. The system 200 includes an application 201 and an operating system (O/S) 202. The operating system 202 includes a virtual storage manager (VSM) 203 configured to manage virtual storage 204, and a real storage manager (RSM) 205 configured to manage real storage. The application 201 may be any type of application comprising program code that is executed on a computer to cause the computer to perform various functions, including calculations, storage, reading from storage, display, or any other functions. Virtual storage 204 may be in the form of tables having virtual addresses and the VSM 203 can maintain information regarding the addresses, such as whether the addresses are allocated for use by the application 201 or operating system 202, or whether the addresses are free to be allocated. As the application 201 runs, memory may need to be allocated to the program to perform certain functions. The VSM 203 assigns or allots virtual memory to the application 201 in pre-defined segment sizes, these segments are referred to herein as pages. The operating system 202 also includes learned data 208 that is stored data regarding the memory utilization of the program 201. The learned data 208 can include page faults experienced by the program 201 and a history of data allocation and access requests made by the program 201. In exemplary embodiments, the pre-defined segment sizes may correspond to any pre-defined segment size, such as 8 bytes, 4 Kbytes, 1 Mbyte, or any other pre-defined size, according to the design considerations of the O/S 202.

During execution of the program 201, the VSM 203 communicates with the RSM 205 to back the assigned virtual memory segments with memory segments in real storage 206. The virtual memory segments may be backed by any segment sizes in real storage 206. In exemplary embodiments, the operating system 202 determines which pages of the virtual storage 204 to back in the real storage 206 based on the learned data 208. In addition, the learned data 208 can be used to determine the time at which various pages of the virtual storage 204 will be backed in the real storage 206.

In exemplary embodiments, the RSM 205 determines a size of a segment in real storage 206 to back allocated virtual storage 204 based on the learned data 208 and on design considerations of the system 200, such as available memory, types of applications, types of memory, the size of the allocated memory segment, or any other considerations for controlling a size of backing memory. The RSM 205 backs the allocated segments of virtual storage 204 with segments of real storage 206 that may not necessarily correspond to the locations in virtual storage 204. For example, if 1 MB of consecutive addresses are allotted in virtual storage 204, 1 MB of non-consecutive addresses may be designated by the real storage manager 205 to back the allotted segment in virtual storage 204. The RSM 205 maintains one or more translation tables 207 including segment tables and page tables to provide the O/S 202 and the application 201 with data stored in real storage 206 corresponding to requests from the O/S 202 and application 201 to access corresponding virtual addresses.

In exemplary embodiments, memory allocated by the VSM 203 can be backed by multiple discrete sizes of segments of real storage 206. In the description to follow, the terms "large" and "small" with reference to pages or frames refer to two pre-defined and distinct sizes of memory, such as 1 MB and 4 kbytes, respectively. Embodiments include systems having a small number of sizes real memory to back virtual memory, such as two, three, or four distinct sizes. For example, in one embodiment, a pre-defined "large" size corresponds to a size of memory accessible by a segment table of the RSM 205, and the pre-defined "small" size corresponds to a size of memory accessible by the combination of the segment table and a page table of the RSM 205. The use of translation tables 207, including segment tables, page tables, and offsets, is known in the art and is not described in detail in the present disclosure.

Figure 3:
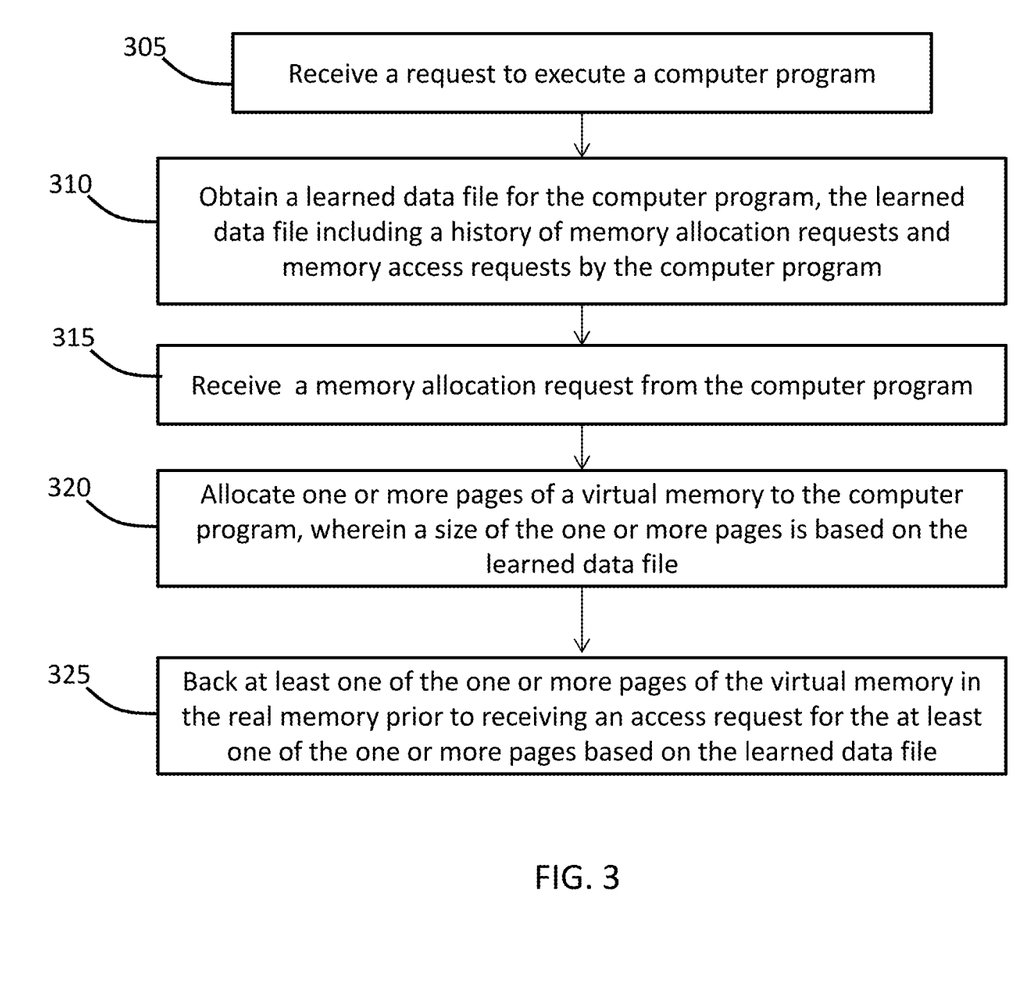
FIG. 3 illustrates a flowchart diagram of a method for pre-backing virtual memory with real memory based on learned data according to an embodiment.

Referring now to FIG. 3 a flowchart of a method for pre-backing virtual memory with real memory based on learned data according to an embodiment is shown. As shown at block 305, the method includes receiving a request to execute a computer program. Next, as shown at block 310, the method includes obtaining a learned data file for the computer program. The learned data file including a history of memory allocation requests and memory access requests by the computer program. In exemplary embodiments, the learned data file can include a history of faults that the program has experiences. These faults can include faults where the requested data was never referenced before or faults where the storage was backed before but the operating system subsequently decided to page it out to auxiliary storage and now it needs to be brought back into the main memory as it is needed again.

Next, the method includes receiving a memory allocation request from the computer program, as shown at block 315. The method also includes allocating one or more pages of a virtual memory to the computer program, wherein a size of the one or more pages is based on the learned data file, as shown at block 320. Next, as shown at block 325, the method includes backing at least one of the one or more pages of the virtual memory in the real memory prior to receiving an access request for the at least one of the one or more pages based on the learned data file. In exemplary embodiments, the method can also include updating the learned data file based on the memory allocation requests and memory access requests received from the computer program.

In exemplary embodiments, the method can also include receiving an access request for a first page of a virtual memory that was previously allocated and backing one or more additional pages the virtual memory in the real memory prior to receiving an access request for the one or more additional pages based on the learned data file.

In exemplary embodiments the history of memory access requests can include a number of pages included in each request by the computer program, a size of each of the pages requested by the computer program, and a time between a start of execution of the computer program and each memory access request by the computer program. In one embodiment, the history of memory allocation requests can include a size of each memory allocation request and a time between a start of execution of the computer program and each memory allocation request by the computer program.

In one embodiment, the history of memory allocation requests can include a memory reference pattern for each allocation request by the computer program, wherein the memory reference pattern consists of one of a sparse request or a sequential request. A sequential request is a request for large pieces of the storage that are referenced contiguously and a sparse request includes a request that includes large gaps between referenced pages. In exemplary embodiments, sparse request patterns can also have large enough contiguous sections where they can be allocated with larger pages.

In exemplary embodiments, the operating system of computer is configured to learn how storage related to previous allocations was referenced in order to predict the proper up front backing and page size to use for subsequent allocations from the same program. In exemplary embodiments, the operating system utilizes an allocation history gathering period of time and a scoring of the data collected to determine how to allocate virtual memory for the program and when to back the virtual memory. In exemplary embodiments, a learned data file is created based on the history and the scoring. The learned data file is used to perform up front backing of pages in virtual memory with real memory and to determine the page size allocated in the virtual memory. In exemplary embodiments, the scoring of the collected data can use different sets of scored history at different times of the day, month or year to limit the amount of storage required to hold the scored data.

In exemplary embodiments, the learned data file includes a memory reference pattern history table. The memory reference pattern history table can include each storage allocation request for storage and its attributes in timed sequence. The attributes include an amount and a type of the requested storage. In one embodiment, each allocation request is tracked during a learning period but only allocations with confidence levels that are higher than a minimum threshold are kept for production.

In exemplary embodiments, the learned data file also includes a memory reference map. The memory reference map includes a representation of previous virtual page first reference page faults and the page size for each storage allocation request. In one embodiment, a counter starting at 0 for each 4 k page starting from the start of the allocation request can be used to determine the first reference page fault. For example, a storage request of 32K results in eight 4 k real storage pages possibly being required. If only pages 1 and 3 are referenced during execution of the program, then only page fault counters 1 and 3 would have been incremented. In another embodiment, data regarding table lookaside buffer (TLB) misses will be collected during execution of a program. This TLB miss data can be cross referenced with the contiguously referenced pages and used to determine if a set of contiguous pages should be escalated to a larger page.

Figure 4:
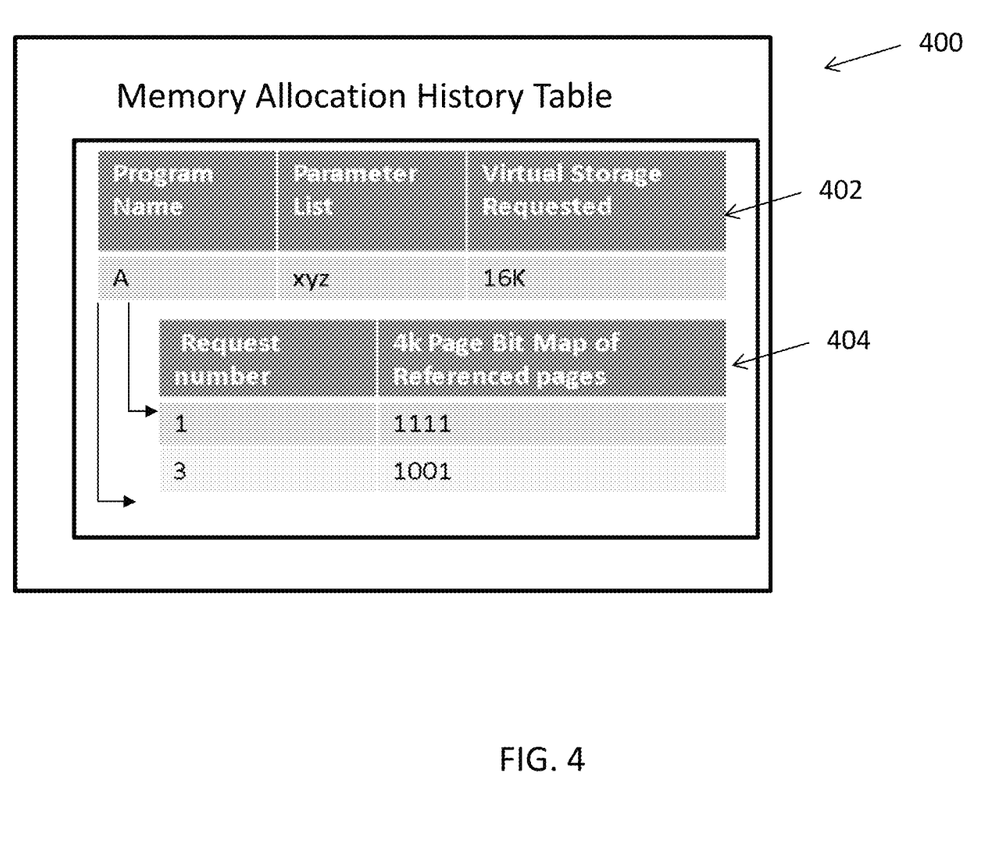
FIG. 4 illustrates a block diagram of a memory allocation history table in accordance with an embodiment.

Referring now to FIG. 4, a memory allocation history table 400 in accordance with an embodiment is shown. As illustrated the memory allocation history table 400 includes a first table 404 that stores a list of all of the memory allocation requests received. The memory allocations stored in the first table 402 each include a name of a program that requested a memory allocation, a parameter list for the program and an amount of the virtual storage requested by the program. In addition, the memory allocation history table 400 includes a second table 404 that stores additional data that corresponds to an entry in the first table 402. The second table 404 stores each memory access request made by the program and a bit map that is used to track the pages of the allocated virtual memory that are requested.

In exemplary embodiments, memory allocation history tables can be created during testing and/or execution of the program during a learning period, to accumulate data used to create the learned data file. After the learning period is over, the memory allocation tables for multiple executions of the program are compared using analytics to determine a usage confidence score based on the usage pattern. In exemplary embodiments, when an allocation request is received from a program, a lookup can be performed to find an entry in the memory allocation history table 400 that corresponds to a request from the same program with the same parameters. If no entry is found, then no pre-allocation outside the norm is done. However, if an entry is found in the first table 402 that corresponds to the allocation request, then the storage manager will use the data in the second table 404 to determine how the requested storage should allocated.

Figure 5:
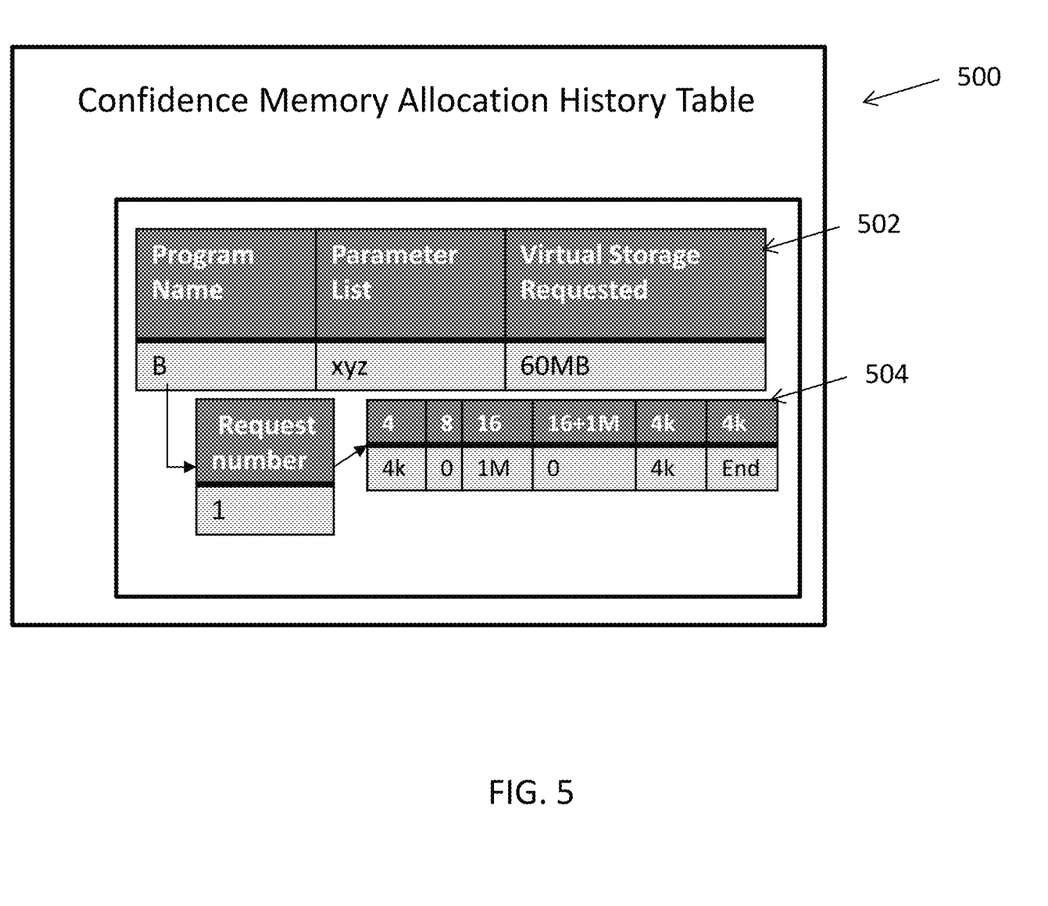
FIG. 5 illustrates a block diagram of a confidence memory allocation history table in accordance with an embodiment.

Referring now to FIG. 5, a confidence memory allocation history table 500 in accordance with an embodiment is shown. As illustrated the confidence memory allocation history table 500 includes a first table 502 that stores a list of all of the memory allocation requests received. The memory allocations stored in the first table 502 each include a name of a program that requested a memory allocation, a parameter list for the program and an amount of the virtual storage requested by the program. In addition, the memory allocation history table 500 includes a second table 504 that stores additional data that corresponds to an entry in the first table 502.

In exemplary embodiments, the confidence allocations are determined and based on the 4 k Page Bit Map Reference in the memory allocation history table 400. In exemplary embodiments, entries in the confidence allocation history table 500 are used to determine how the virtual storage should be backed at allocation time. The structure of the confidence allocation history table 500 is designed to allow allocation routines to easily determine how to back each of the virtual pages by a page size range. In one embodiment, at the time of allocation, the storage manager access the confidence allocation history table 504 for each virtual 4 k range, a zero entry indicates that pre-backing of the storage is not needed. If the table 504 includes a 4 k entry, the virtual storage is back with a 4 k page in the real memory. If the table 504 includes a 1 MB entry, the virtual storage in the range is backed, starting from the current range offset for 1 MB with a 1 MB and moves the range up by 1 MB. In other words, the next table entry will be for that next page after the 1 MB page. The same processing is done for any page size, i.e. use the page size indicated to back the range starting at the range offset up to through the indicated page size and the next entry is for the subsequent starting range. When an END entry is reached in the table 504, no more pages in the range are backed as that page and no follow on pages are normally referenced.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention to the particular embodiments described. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosed embodiments. Many modifications and variations will be apparent to those of ordinary skill in the art without departing from the scope and spirit of the embodiments of the present disclosure.

While preferred embodiments have been described above, it will be understood that those skilled in the art, both now and in the future, may make various improvements and enhancements which fall within the scope of the claims which follow.

What is claimed is:

1. A computer-implemented method for pre-backing virtual memory with real memory based on learned data, the method comprising:
   receiving, by a processor, a request to execute a computer program, wherein the computer program is configured to make memory access requests from the real memory;
   obtaining, by the processor, a learned data file for the computer program, the learned data file including a history of memory allocation requests and memory access requests by the computer program, wherein the history of memory access requests includes a time between a start of execution of the computer program and each memory access request by the computer program;
   receiving, by the processor, a memory allocation request from the computer program;
   allocating one or more pages of a virtual memory to the computer program, wherein a size of the one or more pages is based on the learned data file; and
   backing at least one of the one or more pages of the virtual memory in the real memory prior to receiving an access request for the at least one of the one or more pages based on the learned data file.

2. The computer-implemented method of claim 1, further comprising updating the learned data file based on the memory allocation requests and memory access requests received from the computer program.

3. The computer-implemented method of claim 1, wherein the history of memory access requests includes a number of pages included in each request by the computer program.

4. The computer-implemented method of claim 3, wherein the history of memory access requests includes a size of each of the pages requested by the computer program.

5. The computer-implemented method of claim 1, wherein the history of memory allocation requests includes a memory reference pattern for each allocation request by the computer program, wherein the memory reference pattern consists of one of a sparse request or a sequential request.

6. The computer-implemented method of claim 1, wherein the history of memory allocation requests includes a size of each memory allocation request and a time between a start of execution of the computer program and each memory allocation request by the computer program.

7. A computer program product for pre-backing virtual memory with real memory based on learned data, the computer program product comprising:
a non-transitory computer readable storage medium having computer readable instructions stored thereon that, when executed by a processing unit implements a method, comprising:
receiving, by a processor, a request to execute a computer program, wherein the computer program is configured to make memory access requests from the real memory;
obtaining, by the processor, a learned data file for the computer program, the learned data file including a history of memory allocation requests and memory access requests by the computer program, wherein the history of memory access requests includes a time between a start of execution of the computer program and each memory access request by the computer program;
receiving, by the processor, a memory allocation request from the computer program;
allocating one or more pages of a virtual memory to the computer program, wherein a size of the one or more pages is based on the learned data file; and
backing at least one of the one or more pages of the virtual memory in the real memory prior to receiving an access request for the at least one of the one or more pages based on the learned data file.

8. The computer program product of claim 7, further comprising updating the learned data file based on the memory allocation requests and memory access requests received from the computer program.

9. The computer program product of claim 7, wherein the history of memory access requests includes a number of pages included in each request by the computer program.

10. The computer program product of claim 9, wherein the history of memory access requests includes a size of each of the pages requested by the computer program.

11. The computer program product of claim 7, wherein the history of memory allocation requests includes a memory reference pattern for each allocation request by the computer program, wherein the memory reference pattern consists of one of a sparse request or a sequential request.

12. The computer program product of claim 7, wherein the history of memory allocation requests includes a size of each memory allocation request and a time between a start of execution of the computer program and each memory allocation request by the computer program.

13. A computer system, comprising:
a real memory; and
a processor configured to:
receive a request to execute a computer program, wherein the computer program is configured to make memory access requests from the real memory;
obtain a learned data file for the computer program, the learned data file including a history of memory allocation requests and memory access requests by the computer program, wherein the history of memory access requests includes a time between a start of execution of the computer program and each memory access request by the computer program;
receive a memory allocation request from the computer program;
allocate one or more pages of a virtual memory to the computer program, wherein a size of the one or more pages is based on the learned data file; and
back at least one of the one or more pages of the virtual memory in the real memory prior to receiving an access request for the at least one of the one or more pages based on the learned data file.

14. The computer system of claim 13, wherein the history of memory access requests includes a number of pages included in each request by the computer program.

15. The computer system of claim 14, wherein the history of memory access requests includes a size of each of the pages requested by the computer program.

16. The computer system of claim 13, wherein the history of memory allocation requests includes a memory reference pattern for each allocation request by the computer program, wherein the memory reference pattern consists of one of a sparse request or a sequential request.

17. The computer system of claim 13, wherein the history of memory allocation requests includes a size of each memory allocation request and a time between a start of execution of the computer program and each memory allocation request by the computer program.

* * * * *